United States Patent [19]
Murata et al.

[11] Patent Number: 5,378,557
[45] Date of Patent: Jan. 3, 1995

[54] FILM TYPE BATTERY

[75] Inventors: Kazuo Murata; Kenichi Takeuchi; Syuichi Izuchi; Shiro Kato, all of Takatsuki, Japan

[73] Assignee: Yuasa Corporation, Osaka, Japan

[21] Appl. No.: 39,158

[22] PCT Filed: Aug. 6, 1992

[86] PCT No.: PCT/JP92/01007

§ 371 Date: Apr. 7, 1993

§ 102(e) Date: Apr. 7, 1993

[87] PCT Pub. No.: WO93/03504

PCT Pub. Date: Feb. 18, 1993

[30] Foreign Application Priority Data

Aug. 9, 1991 [JP] Japan ................. 3-224654
Oct. 16, 1991 [JP] Japan ................. 3-298238

[51] Int. Cl.$^5$ ............................... H01M 2/08
[52] U.S. Cl. ........................ 429/127; 429/162; 429/185
[58] Field of Search ............. 429/127, 162, 185

[56] References Cited

U.S. PATENT DOCUMENTS

| | | | |
|---|---|---|---|
| 4,520,085 | 5/1985 | Wyser | 429/185 X |
| 4,548,880 | 10/1985 | Suzuki et al. | 429/162 |
| 5,227,264 | 7/1993 | Duval et al. | 429/162 X |

FOREIGN PATENT DOCUMENTS

| | | |
|---|---|---|
| 0228757 | 7/1987 | European Pat. Off. . |
| 2539251 | 7/1984 | France . |
| 57-80656 | 5/1982 | Japan . |
| 57-80657 | 5/1982 | Japan . |
| 57-80658 | 5/1982 | Japan . |
| 57-80660 | 5/1982 | Japan . |
| 57-80661 | 5/1982 | Japan . |
| 57-80662 | 5/1982 | Japan . |
| 57-80663 | 5/1982 | Japan . |
| 58-51460 | 3/1983 | Japan . |
| 58-51461 | 3/1983 | Japan . |
| 58-51462 | 3/1983 | Japan . |
| 58-51463 | 3/1983 | Japan . |
| 58-51464 | 3/1983 | Japan . |
| 60-160559 | 8/1985 | Japan . |
| 60-165041 | 8/1985 | Japan . |
| 60-165042 | 8/1985 | Japan . |
| 61-126766 | 6/1986 | Japan . |
| 61-176054 | 8/1986 | Japan . |
| 61-214354 | 9/1986 | Japan . |
| 61-214355 | 9/1986 | Japan . |
| 61-225759 | 10/1986 | Japan . |
| 62-198664 | 12/1987 | Japan . |
| 63-80470 | 4/1988 | Japan . |
| 63-241855 | 10/1988 | Japan . |
| 63-250051 | 10/1988 | Japan . |
| 3-80964 | 8/1991 | Japan . |
| 652239 | 10/1985 | Switzerland . |

OTHER PUBLICATIONS

Riyouichi; Jtoh et al., vol. 7, No. 008 (E-152) 13 Jan. 1993 & JP-A-57 165-955 (Matsushita Denki Sangyo K.K.).

Fumichika Katou, vol. 8, No. 66, (E-234-)(1503), Mar. 28, 1984 & JP-A-58 214-271 (Citizen Tokei K.K.).

*Primary Examiner*—Stephen Kalafut
*Attorney, Agent, or Firm*—Wegner, Cantor, Mueller & Player

[57] ABSTRACT

In a film type battery comprising a generating element which is formed by laminating a negative active material, an electrolyte and a positive active material into a layer shape, (1, 2, 3), terminal plates (5, 6) which are installed on and under the generating element and serve also as a current collector and a container, and a frame-shaped sealing material (4) which is installed on peripheral edges of the terminal plates, seals the generating element in between the both terminal plates and insulates one terminal plate from the other; the sealing material is improved. For example, the sealing material is formed into a vertical-type multi-layer structure, in which at least one layer is composed of a layer (41, 42) comprising metal and the other layer (43) is composed of an electric insulator. Thereby, a mechanical strength of the sealing material or a battery becomes large and the battery becomes hard to be bent. Accordingly, an ingress of atmosphere from a sealing portion and a leakage of electrolyte therefrom can be prevented, a deterioration of battery performance can be prevented, and a long-term reliability can be improved.

7 Claims, 8 Drawing Sheets

FILM TYPE BATTERY

DESCRIPTION

1. Technical Field

This invention relates to a film type battery for use in a portable electric equipment and a battery powered equipment etc., and especially to improvement of a sealing material.

2. Background Art

In recent years, the portable electric equipment and the battery powered equipment have been minimized in size and thickness rapidly, and demands for minimizing size and thickness of batteries for use in these equipments have been increased in proportion to the above tendency. Especially, a demand for film type battery with a high reliability and having a thickness of under 0.5 mm incl. is increasing.

As for a film type battery using light metal represented by lithium as a negative active material, a battery having a thickness of as small as 0.1 mm is produced at present, and in this battery thicknesses of a current collector and a sealing portion become comparatively thin as small as tens of microns.

Figure 13:
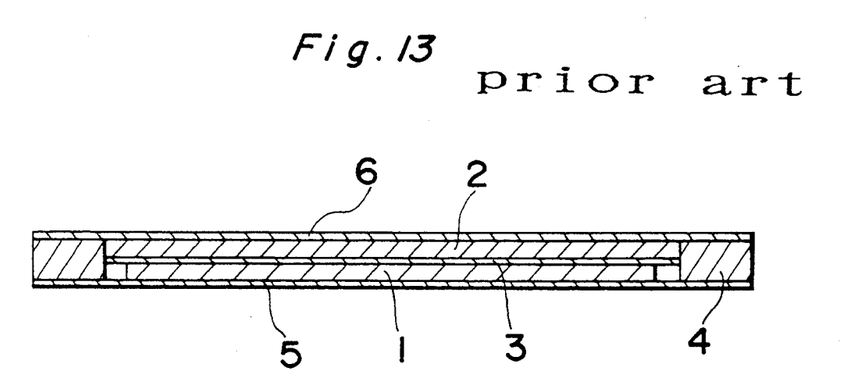
FIG. 13 is a vertical sectional view showing a conventional film type battery.

FIG. 13 is a vertical sectional view showing an example of a conventional film type battery. In the figure, 1 denotes a negative active material layer, 2 denotes a positive active material layer, and 3 denotes an ion conductive electrolyte layer; and a generating element is composed of these components. Metallic lithium, for example, is used for the negative active material. 5 denotes a negative terminal plate, 6 denotes a positive terminal plate, and the terminal plates 5 and 6 serve also as a current collector and a container. A stainless plate and a nickel plate etc. having a thickness of 15 to 30 microns are used for the terminal plates 5 and 6. A frame-shaped sealing material 4, which seals the above generating element in between the both terminal plates 5 and 6 and insulates the terminal plate 5 from the terminal plate 6, is installed on peripheral edges of the terminal plates 5 and 6. The sealing material 4 is made of denatured polypropylene resin.

The film type battery, which utilizes a light metal represented by the lithium as the negative active material, is frequently used for portable electric equipments. In such a case, a reliability i.e. a difficulty to be bent and a durability to long service, in other words a long-term reliability, is required for the film type battery. However, since the sealing material 4 is made of the denatured polypropylene resin in the film type battery having the above-mentioned constructions, its mechanical strength is small so that it is apt to be bent and a clearance is easily produced at a sealing portion. For this reason, when the film type battery having the above construction has been put in service for a long period, there has been such a trouble that a battery performance has been deteriorated due to a leakage of electrolyte or an ingress of moisture and oxygen from the sealing portion. If moisture enters the battery, it reacts with the metallic lithium forming the negative active material so that a battery capacity is lessened.

Figure 14:
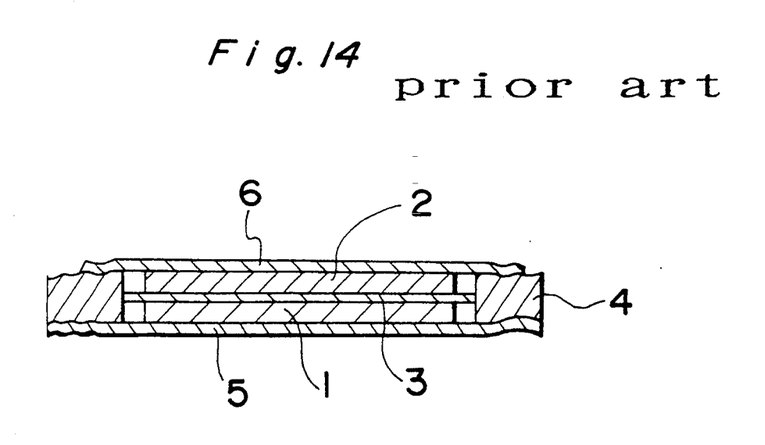
FIG. 14 is a vertical sectional view showing controversial points of the conventional film type battery.

Further, when installing the sealing material 4 in the film type battery having the above-mentioned construction, the terminal plates 5 and 6 have been thermally bonded to the sealing material 4 after installing the sealing material 4 on the peripheral edges of the terminal plates 5 and 6. However, since a thermal shrinkage factor of the sealing material 4 is different from those of the terminal plates 5 and 6, there has been such a trouble in the same way as the above that a battery performance has been deteriorated due to wrinkles formed on the sealing portion as shown by FIG. 14, so that residual stresses have been produced and a part of the sealing portion has been opened by a stress applied thereon during use of battery so as to permit atmosphere to enter an inside of battery.

Figure 15:
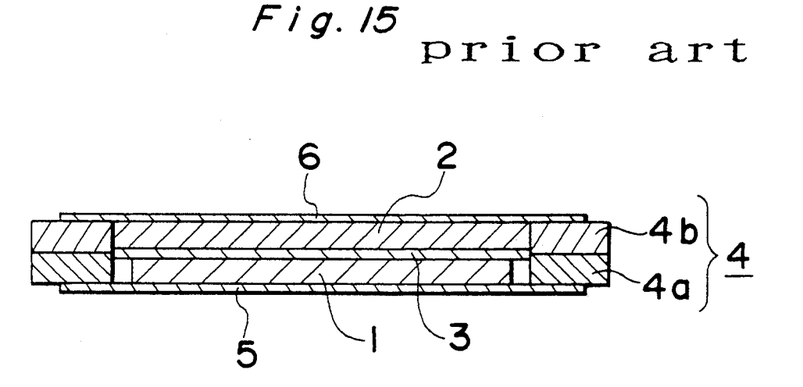
FIG. 15 is a vertical sectional view showing an another conventional film type battery.
Figure 16:
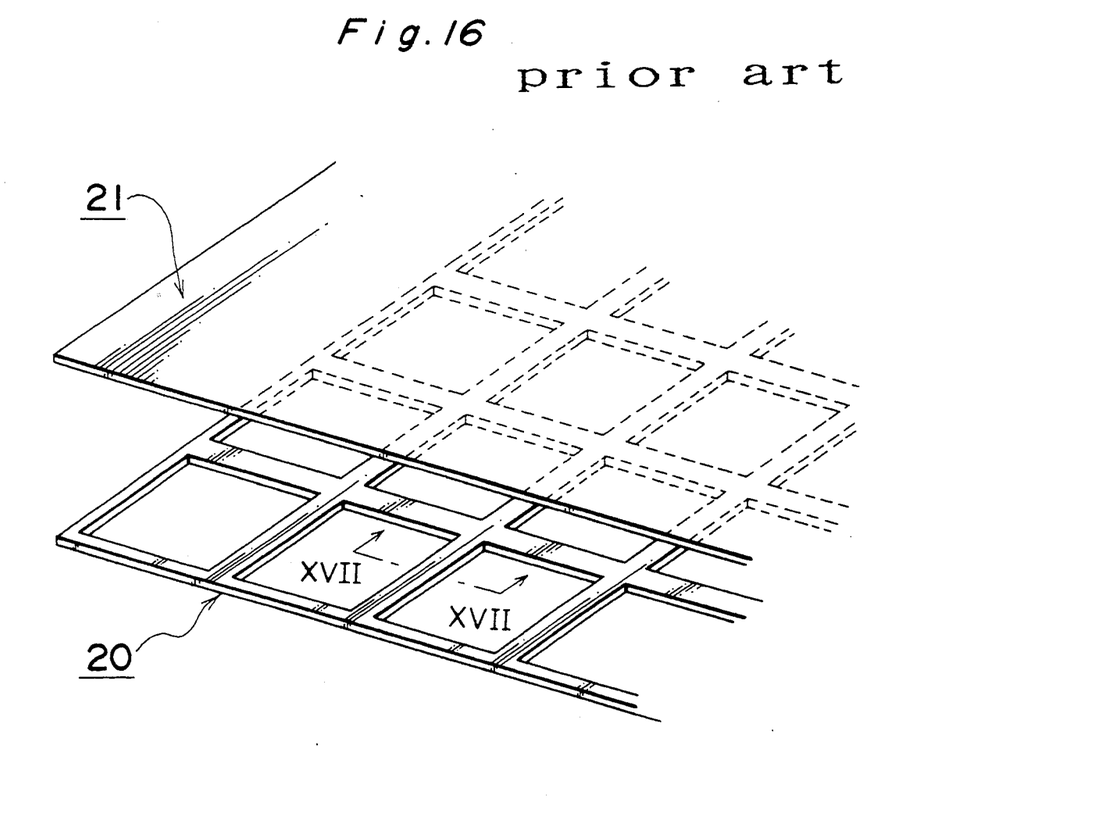
FIG. 16 is an oblique view showing a starting material for use in manufacture of the sealing material and the terminal plate.
Figure 17:
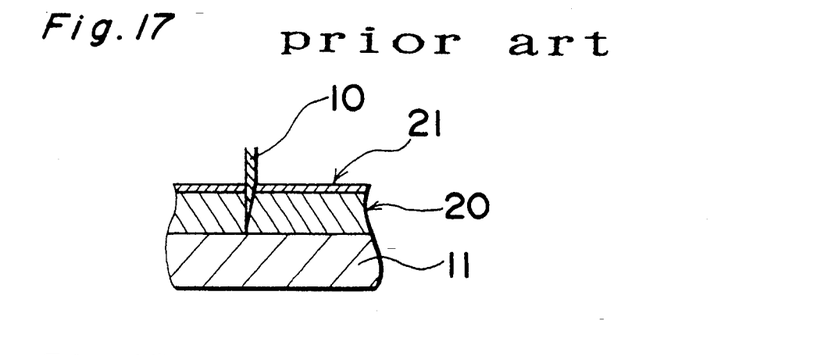
FIG. 17 through FIG. 19 are vertical sectional partial views showing a part of manufacturing process, in order, of the film type battery of FIG. 15.
Figure 18:
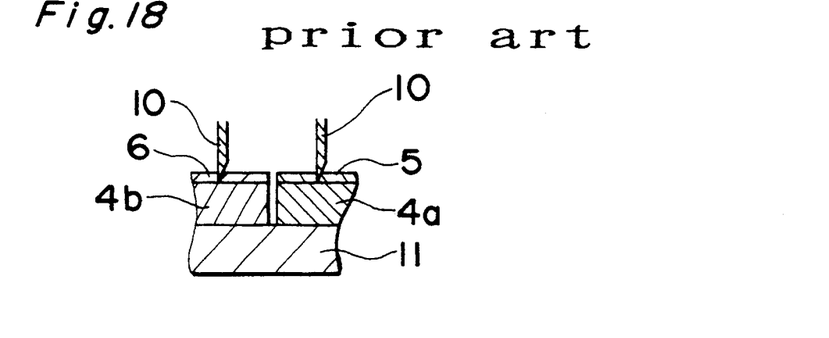
Figure 19:
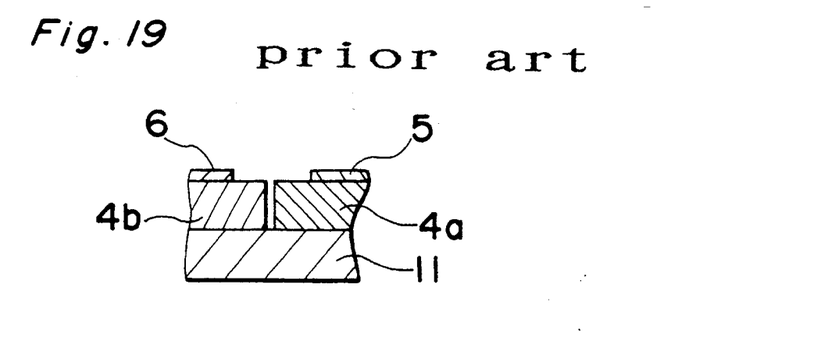

A film type battery including the sealing material 4 having a double-layer structure as illustrated in FIG. 15 is also well known. 4a is a negative-side sealing material and 4b is a positive-side sealing material. In this film type battery, in order to avoid an external short-circuiting due to contact of the terminal plate 5 with the terminal plate 6 at their peripheral edges, outside dimensions of the terminal plates 5 and 6 are made smaller than outside dimensions of the sealing materials 4a and 4b. Such a junction of the sealing material 4a with the terminal plate 5 and a junction of the sealing material 4b with the terminal plate 6, have been manufactured simultaneously and consecutively through processes shown by FIG. 16 through FIG. 19. Namely, in the first place, a grid 20 as illustrated by FIG. 16 is prepared, and the grid 20 is welded to a stainless plate 21, for example, forming the terminal plate. Incidentally, the grid 20 is made of the same material as that of the sealing material 4, has the same thickness as those of the sealing materials 4a and 4b, and has a structure including many sealing materials 4a and 4b integrally. In the second place, the grid 20 is placed on a hard ground film 11 as illustrated by FIG. 17, and a cut is made into the grid 20 by a half cutter 10 so as to separate it as shown by FIG. 18. In FIG. 18, for example, a right side is assumed as a junction of the sealing material 4a with the terminal plate 5, and a left side is assumed as a junction of the sealing material 4b with the terminal plate 6. FIG. 17 through FIG. 19 correspond to a sectional view taken on the line XVII—XVII of FIG. 16. Then, cuts are made only into the terminal plates 5 and 6 respectively by the half cutter 10 as illustrated by FIG. 18, so that the terminal plates 5 and 6 are removed from the cut lines as illustrated by FIG. 19. In such a manufacturing method, however, since the terminal plates 5 and 6 have been hard and the sealing materials 4a and 4b have been soft, there has been a possibility that the cuts have been made up to the sealing materials 4a and 4b so as to break them separately in the process of FIG. 18. If junctions in which the cuts are made up to the sealing materials 4a and 4b are used in the process of FIG. 18, there is a possibility that the external short-circuiting would occur due to the contact of the terminal plate 5 with the terminal plate 6 at their peripheral edges. That is, in the film type battery constructed as shown by FIG. 15, the external short-circuiting has not been prevented sufficiently, and the productivity has been worse because it has been a hard work to make cuts only into the terminal plates 5 and 6 in the process of FIG. 18.

DISCLOSURE OF THE INVENTION

A first object of this invention is to provide a film type battery which is excellent in a long-term reliability.

A second object of this invention is to provide a film type battery which can prevent an external short-circuiting sufficiently and has a good productivity.

In order to accomplish the above first object, a first invention of this application provides a film type battery comprising a generating element which is formed by laminating a negative active material, an electrolyte and a positive active material into a layer shape, terminal plates which are installed on and under the generating element and serve also as a current collector and a container, and a frame-shaped sealing material which is installed on peripheral edges of the terminal plates, seals the generating element in between the both terminal plates and insulates one terminal plate from the other; characterized by that the sealing material is formed into a vertical-type multi-layer structure in which at least one layer is made of metal and the others are made of an electrical insulator. A second invention of this application is characterized by that the sealing material is formed into a vertical-type multi-layer structure in which a foreign material layer comprising a material, a thermal shrinkage factor of which is closer to that of the terminal plate rather than that of denatured polyolefin-group resin, is sandwiched between adhesive agent layers comprising the denatured polyolefin-group resin. A third invention of this application is characterized by that the sealing material is formed into an outside/inside-type multi-layer structure in which a material having a small moisture permeability is used for an outside layer and a material having a large resistance against an electrolyte is used for an inside layer.

In the first invention, a metal layer is included in the multi-layer structure of the sealing material so that the sealing material or a battery is increased in its mechanical strength and becomes hard to be bent. Consequently, the clearance is not produced at the sealing portion so that the deterioration of battery performance due to the ingress of atmosphere or the leakage of electrolyte can be prevented.

In the second invention, since the foreign material layer is sandwiched between the adhesive agent layers, wrinkles become very small which are produced when the terminal plates are thermally bonded to the sealing material, so that the problem of residual stress can be solved. Accordingly, the deterioration of battery performance due to the ingress of atmosphere and the leakage of electrolyte can be prevented.

In the third invention, the penetration of moisture is prevented by the outside layer of the sealing material and the leakage of electrolyte is prevented by the inside layer thereof. Accordingly, the deterioration of battery performance due to the ingress of atmosphere and the leakage of electrolyte can be prevented.

In order to accomplish the second object, a fourth invention of this application provides a film type battery comprising a generating element which is formed by laminating a negative active material, an electrolyte and a positive active material into a layer shape, terminal plates which are installed on and under the generating element and serve also as a current collector and a container, and a frame-shaped sealing material which is installed on peripheral edges of the terminal plates, seals the generating element in between the both terminal plates, and insulates one terminal plate from the other; characterized by that the sealing material is formed into a vertical-type double-layer structure in Which the upper layer sealing material has the same outside dimensions as those of the upper terminal plate, the lower layer sealing material has the same outside dimensions as those of the lower terminal plate, and the outside dimensions of the upper-layer sealing material and the upper terminal plate are different from those of the lowerlayer sealing material and the lower terminal plate.

In the fourth invention, the both terminal plates become hard to contact each other at their peripheral edges so that the external short-circuiting is prevented sufficiently. Further, it is not required to cut only the terminal plates in their manufacturing process, so that the manufacturing work becomes simple and the productivity is improved.

BEST MODE FOR CARRYING OUT THE INVENTION

Embodiment 1

Figure 1:
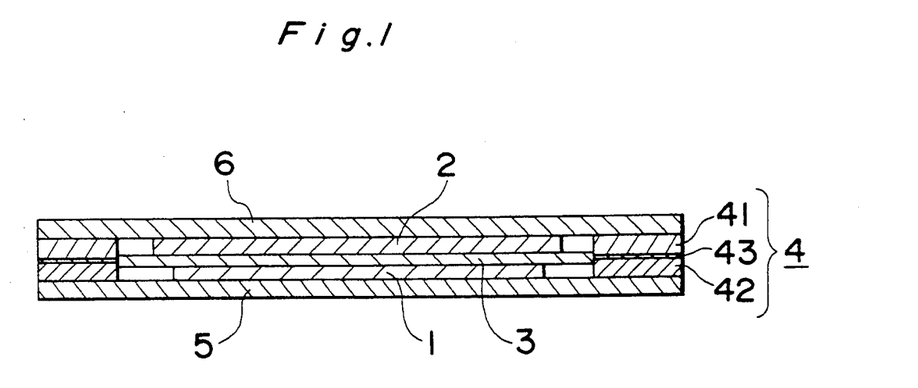
FIG. 1 is a vertical sectional view showing a film type battery of an embodiment 1.

FIG. 1 is a vertical sectional view showing a film type battery of this embodiment. In the figure, 1 denotes a negative active material layer, 2 denotes a positive active material layer, and 3 denotes an electrolyte layer; and a generating element is composed of these components. Metallic lithium is used for the negative active material. A principal component of the positive active material is manganese dioxide. The electrolyte layer 3 is composed of a solid-polymer electrolyte comprising polyethylene oxide added with lithium perchlorate. 5 denotes a negative terminal plate, 6 denotes a positive terminal plate, and the terminal plates 5 and 6 serve also as a current collector and a container. A stainless plate is used for the terminal plates 5 and 6.

A frame-shaped sealing material 4, which seals the above generating element in between the both terminal plates 5 and 6 and insulates the terminal plate 5 from the terminal plate 6, is installed on peripheral edges of the terminal plates 5 and 6. The sealing material 4 has a triple-layer structure in which an electric insulator layer 43 is sandwiched between two metallic layers 41 and 42. The metallic layers 41 and 42 are composed of cobar (Ni: 28%, Co: 18%, Fe: 54%). The electric insulator layer 43 is composed of alumina ceramics. The metallic layers 41 and 42 are adhered to the electric insulator layer 43 by means of thermal bonding or through adhesive agent. The sealing material 4 is melt bonded to the terminal plates 5 and 6 by means of laser welding.

On the other hand, a film type battery was prepared as a comparison example, which had the same structure as that of this embodiment except for the sealing material 4 including a single-layer structure comprising denatured polypropylene resin. That is, the film type battery of comparison example has the same structure as that of the battery shown in FIG. 13.

Figure 2:
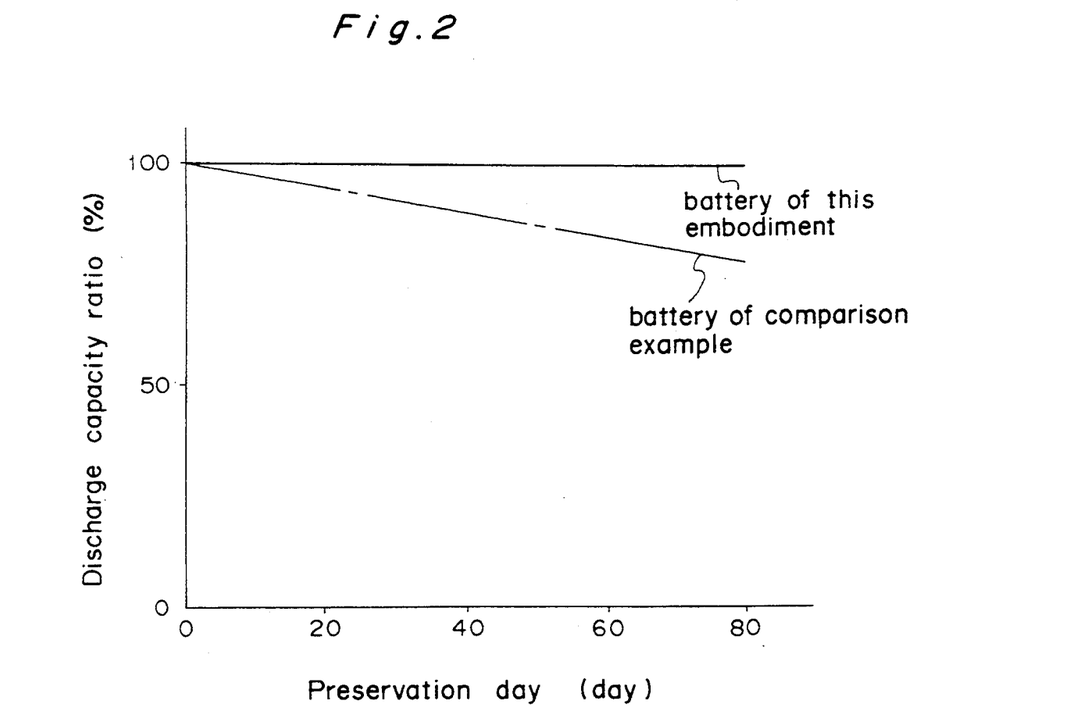
FIG. 2 is a diagram showing a preservation performance of the battery of embodiment 1 in comparison with that of a battery of comparison example.

FIG. 2 is a diagram showing a preservation performance of the battery of this embodiment in comparison with that of the battery of comparison example. An axis of abscissa represents a preservation day and an axis of ordinate represents a discharge capacity ratio (%). The preservation performance was examined by measuring a successive change of battery capacity when the battery was left as it was in an atmosphere of 60° C. temperature and 90% relative humidity. In this diagram, an initial capacity is assumed as 100. As seen from FIG. 2, the battery of this embodiment brings about a small change in capacity i.e. a small deterioration in performance when left as it is for a long period, so that it provides a long-term reliability as compared with the battery of comparison example.

Since the sealing material 4 includes the metallic layers 41 and 42 in the battery of this embodiment, the mechanical strength of the battery is larger than that of the battery of comparison example so that this battery is hard to be bent. Accordingly, in the battery of this embodiment, air-tightness is satisfactorily secured between the sealing material 4 and the terminal plates 5 and 6. Especially, since the cobar forming component material of the metallic layers 41 and 42 has an approximately same coefficient of thermal expansion as that of the alumina ceramics forming component material of the electrical insulator layer 43, the battery of this embodiment is stable against temperature change so that the air-tightness between the sealing material 4 and the terminal plates 5 and 6 is secured well. Therefore, permeabilities of moisture, oxygen, carbon dioxide gas, nitrogen etc. are extremely small in the battery of this embodiment as compared with the battery of comparison example, so that the performance deterioration is small and the long-term reliability is excellent.

As described above, in the battery of this embodiment, the sealing material 4 has the vertical-type triple-layer structure and the metallic layers 41 and 42 are included therein, so that the mechanical strength can be made large, the performance deterioration due to ingress of atmosphere can be prevented, and the long-term reliability can be improved.

Further, the sealing material 4 may be of a triple-layer structure, in which two electric insulator layers are installed and one metallic layer is sandwiched between them.

Moreover, the sealing material 4 is not limited to the triple-layer structure, but may be of a multi-layer structure having at least one metallic layer. However, it goes without saying that the electric insulation layer is so installed as to insulate the terminal plate 5 from the terminal plate 6.

Furthermore, the sealing material 4 may be melt bonded to the terminal plates 5 and 6 by means of electron beam welding or resistance welding.

Aluminium, Fe—Ni alloy (Ni: 42% with Fe: 58% for instance), stainless, copper, nickel etc. may be used for the component material of the metallic layer. In addition, ceramics other than the alumina ceramics or synthetic resin may be used for the component material of the electric insulator layer. Sulfide-group adhesive agent is preferable for the synthetic resin, and polysulfide denatured epoxy resin (Trade name: "FLEP" made by TORAY THIOKOL CO.), polysulfide polymer (Trade name: "THIOKOL LP" made by TORAY THIOKOL CO.) etc., for instance, may be used therefor.

Embodiment 2

Figure 3:
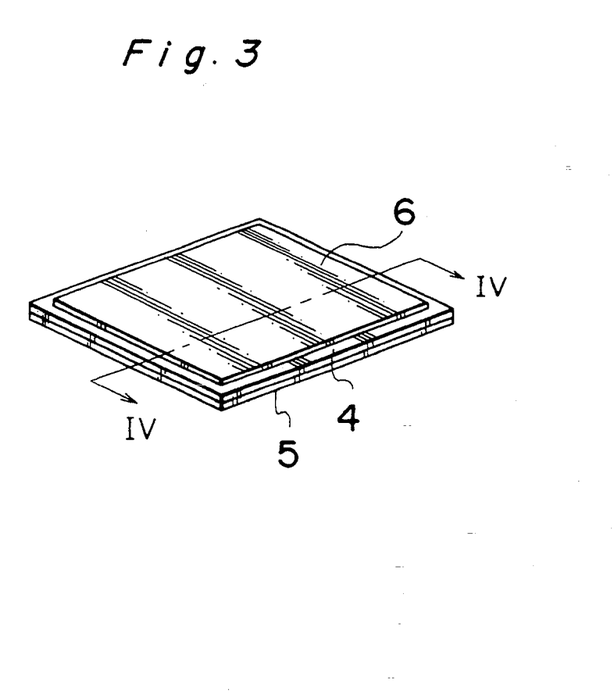
FIG. 3 is an oblique view showing a film type battery of an embodiment 2.
Figure 4:
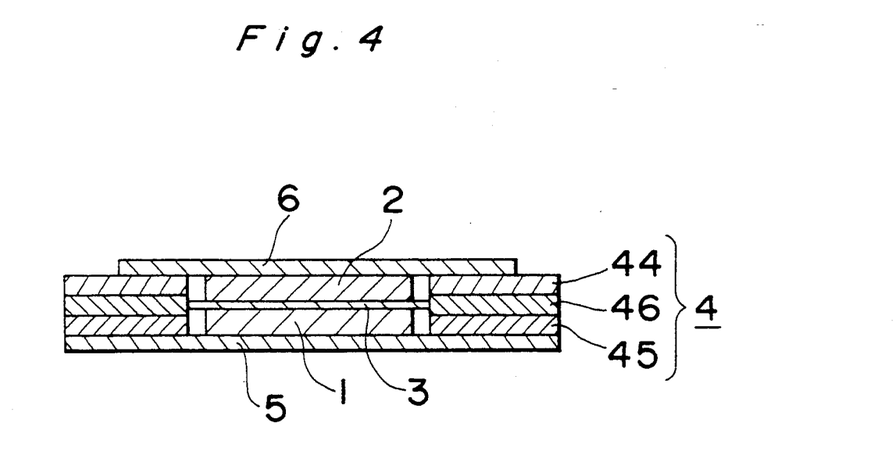
FIG. 4 is a sectional view taken on a line IV—IV of FIG. 3.

FIG. 3 is an oblique view showing a film type battery of this embodiment. FIG. 4 is a sectional view taken on a line IV—IV of FIG. 3. In these figures, components same with or similar to those of FIG. 1 are attached with the same symbols. In the battery of this embodiment, the sealing material 4 has a triple-layer structure in which a foreign material layer 46, comprising a material a thermal shrinkage factor of which is closer to the terminal plates 5 and 6 rather than that of denatured polyolefin-group thermoplastic resin, is sandwiched between adhesive agent layers 44 and 45 comprising the denatured polyolefin-group thermoplastic resin. A material formed by graft polymerizing maleic anhydride to polypropylene resin is used for the denatured polyolefin-group thermoplastic resin forming the component material of the adhesive agent layers 44 and 45, and polypropylene resin is used for the component material of the foreign material layer 46. The polypropylene resin can be considered as a material which is formed by removing a functional group having adhesive function from the denatured polyolefin-group thermoplastic resin forming the component material of the adhesive agent layers 44 and 45. The adhesive agent layers 44 and 45 are bonded to the foreign material layer 46 by means of thermal bonding or through adhesive agent. The sealing material 4 is thermally bonded to the terminal plates 5 and 6.

On the other hand, a film type battery was prepared as a comparison example, which had the same structure as that of this embodiment except for the sealing material 4 including a single-layer structure comprising the same material as that of the adhesive agent layers 44 and 45. That is, the film type battery of comparison example has the same structure as that of the battery shown in FIG. 13.

Figure 5:
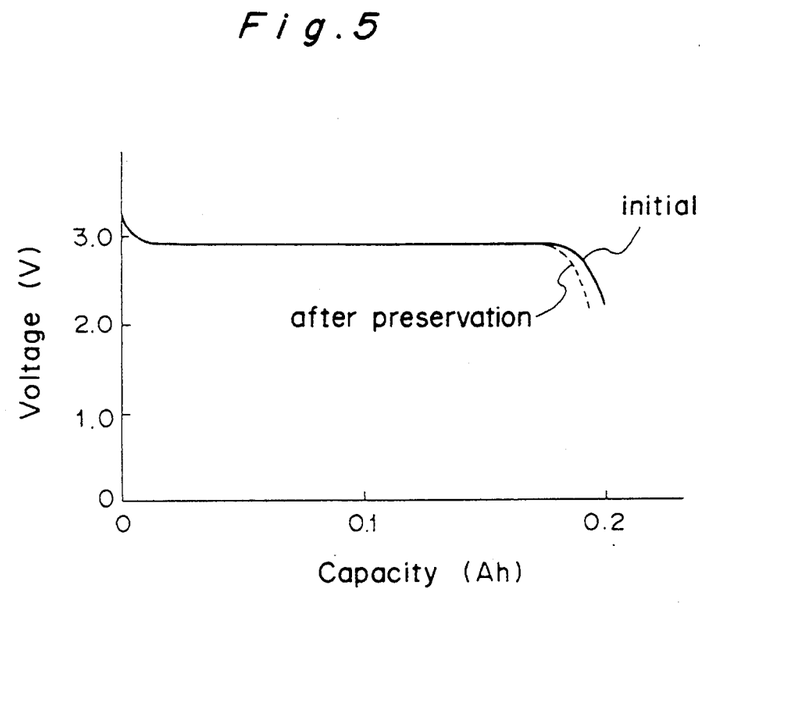
FIG. 5 is a discharge characteristic diagram of the battery of embodiment 2.

Discharge capacities of 0.2 Ah batteries of this embodiment and comparison example were measured at constant discharge current of 20 mA for both cases of initial discharge and discharge after 20 days preservation at 60° C., respectively. FIG. 5 shows a result of the battery of this embodiment, and FIG. 6 shows a result of the battery of the comparison example.

Figure 6:
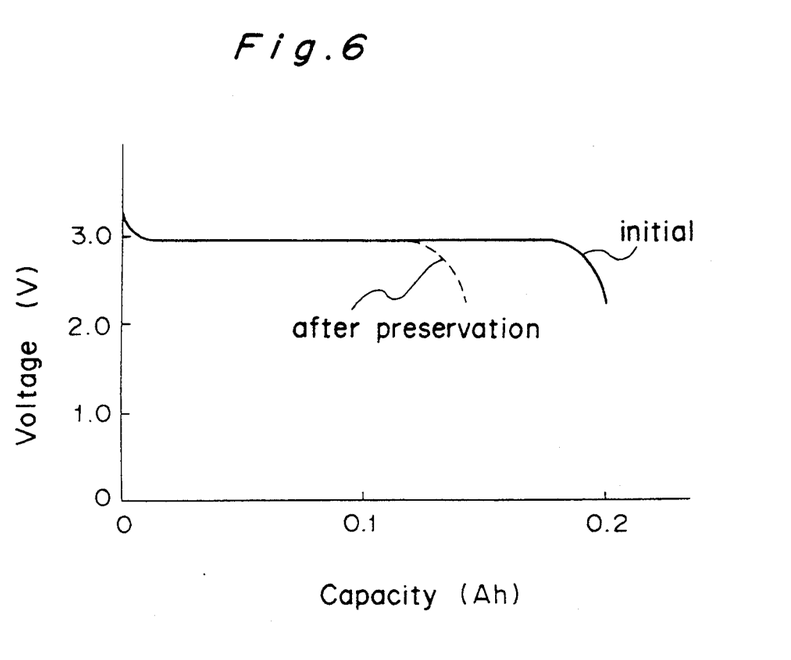
FIG. 6 is a discharge characteristic diagram of a battery of comparison example in the embodiment 2.

As seen from FIG. 5 and FIG. 6, the battery of this embodiment presents little decrease in the capacity even after preservation at high temperature, but the battery of comparison example presents a decrease in the discharge capacity to about 70% of the initial discharge capacity after the preservation at high temperature.

In the battery of this embodiment, the thermal shrinkage factor of the foreign material layer 46 is smaller than those of the adhesive agent layers 44 and 45 and close to those of the terminal plates 5 and 6, so that wrinkles produced when thermally bonding the sealing material 4 to the terminal plates 5 and 6 become extremely small as compared with wrinkles of the battery of comparison example. Namely, it follows that stresses do not remain on sealing portions of the battery of this embodiment. Consequently, in the battery of this embodiment, a part of the sealing material does not open due to a stress applied on the sealing portion during use of battery and the battery performance does not deteriorate due to the ingress of atmosphere in the battery, so that the long-term reliability of battery of this embodiment is improved.

Further, since a principal-chain structure of the component material for the adhesive agent layers 44 and 45 is same as that of the component material for the foreign material layer 46, they are adhered by means of the melt bonding so that they are connected closely each other. In addition, the principal-chain structure is of polyolefin-group type so that the moisture permeability in the sealing material 4 becomes small. Accordingly, the deterioration of battery performance due to the ingress of atmosphere such as moisture in the battery can be prevented preferably.

As described above, since the sealing material 4 has the vertical-type triple-layer structure and the foreign material layer 46 is sandwiched in between the adhesive agent layers 44 and 45 in the battery of this embodiment, wrinkles produced when thermally bonding the sealing material 4 to the terminal plates 5 and 6 can be prevented, i.e. the problem of residual stress can be solved, so that the performance deterioration due to the ingress of atmosphere can be prevented and the long-term reliability can be improved.

The structure of the sealing material 4 is not limited to the triple-layer structure, but may be of a quintuple-layer structure in which the adhesive agent layer and the foreign material layer laminated one another by turns, or may be of a multi-layer structure including more layers.

The material of foreign material layer is not limited to the polyolefin-group thermoplastic resin, but may be a metal if its thermal shrinkage factor is close to that of the terminal plate.

Embodiment 3

Figure 7:
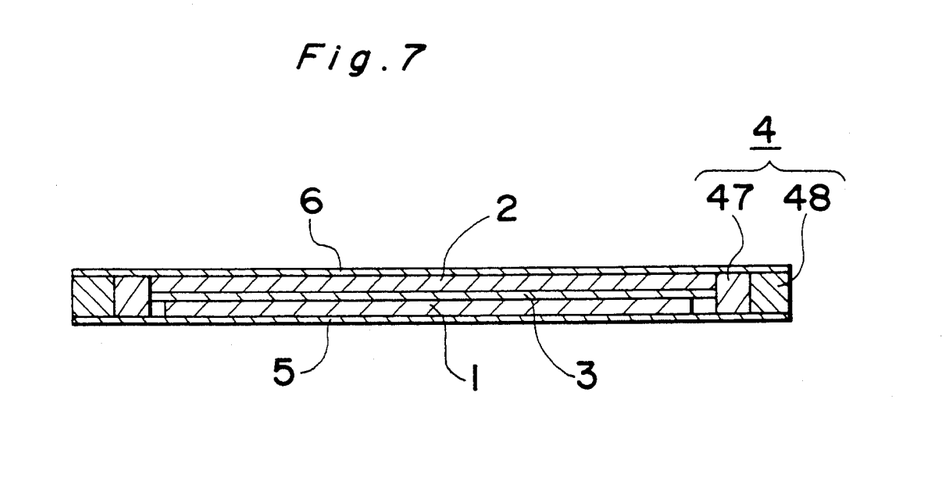
FIG. 7 is a vertical sectional view showing a film type battery of an embodiment 3.

FIG. 7 is a vertical sectional view showing a film type battery of this embodiment. In the figure, components same with or similar to those of FIG. 1 are attached with same symbols. This film type battery has a battery capacity of 50 mAh and a thickness of 0.1 mm. The electrolyte layer 3 is composed of polypropylene nonwoven fabric, and the non-woven fabric is impregnated with nonaqueous solvent electrolyte prepared by solving lithium perchlorate to a mixed solvent of propylene carbonate with dimethoxy ethane. The terminal plates 5 and 6 are stainless steel plate having a thickness of 15 microns.

The sealing material 4 is composed of an inside sealing material 47 and an outside sealing material 48, and has a battery inside/outside-type double-layer structure. A width of each of the sealing materials 47 and 48 is 1.5 mm. The inside sealing material 47 is composed of silicone rubber group adhesive agent and the outside sealing material 48 is composed of denatured polypropylene resin. The sealing material 4 is connected to the terminal plates 5 and 6 at 190° C. by means of thermal pressure bonding. This thermal pressure bonding is carried out under reduced pressure in order to remove air from inside.

On the other hand, a film type battery was prepared as a comparison example, which had the same structure as that of this embodiment except for the sealing material 4 including a single-layer structure comprising denatured polypropylene resin and having a thickness of 3 mm. That is, the film type battery of comparison example has the same structure as that of the battery shown in FIG. 13. It has a battery capacity of 50 mAh and a thickness of 0.1 mm.

Figure 8:
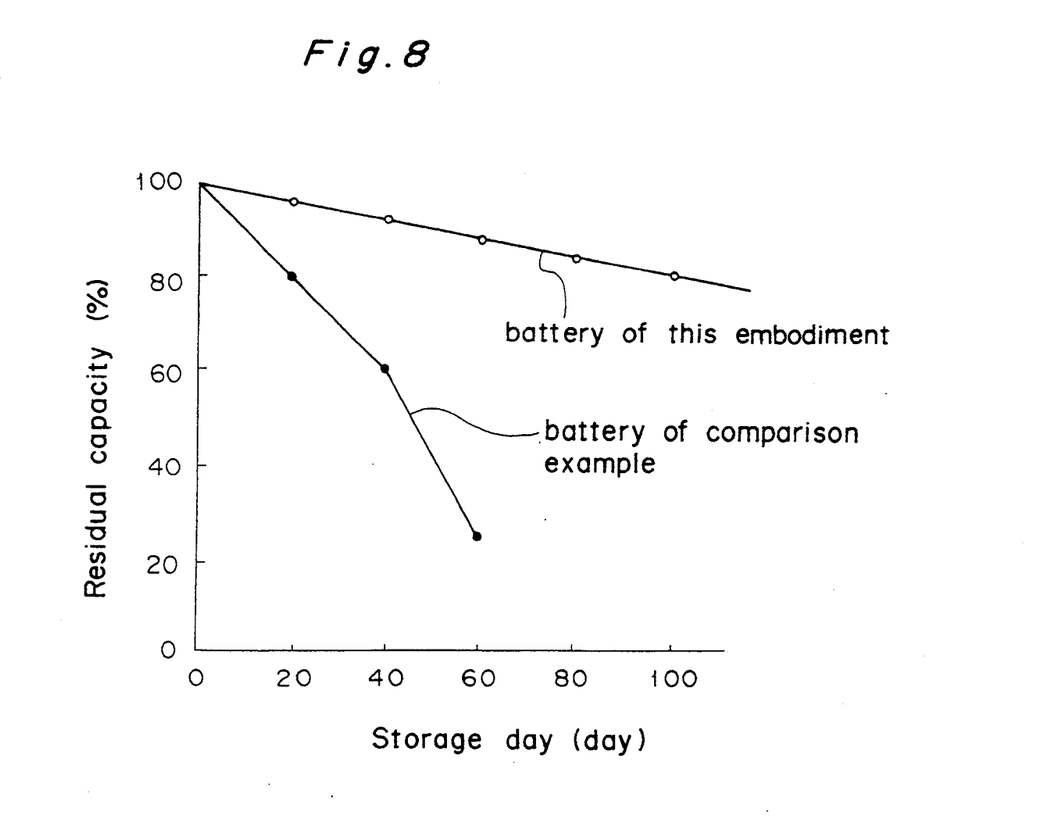
FIG. 8 Is a diagram showing a storage performance of the battery of embodiment 3 in comparison with that of a battery of comparison example.

A storage performance of the battery of this embodiment was compared with that of the battery of comparison example. Namely, both batteries were stored in an air-conditioned bath having a relative humidity of 90 to 95%, and a relation between stored days and decrease in battery capacity was examined. The decrease in battery capacity was examined by discharging down to an end voltage of 2 V at 25° C. with a current of 0.5 mAh and by metering a duration time to measure a residual capacity. Number of test battery was five for each measuring stage, and mean values were calculated. Results are shown in FIG. 8. In FIG. 8, an axis of abscissa denotes a storage day and an axis of ordinate denotes a residual capacity (%).

As seen from FIG. 8, the decrease in battery capacity of the battery of this embodiment is very small and its storage performance is excellent. The decrease in battery capacity of the battery of comparison example is large, and its electrolyte leaked after 60 days. In the battery of this embodiment, since the denatured polypropylene resin forming the component material of the outside sealing material 48 has a small moisture permeability, the ingress of moisture into the battery inside is controlled, so that an exhaustion of metallic lithium forming the negative active material caused by reaction with moisture is prevented. Further, the silicone rubber-group adhesive agent forming the component material of the inside sealing material 47 has a large resistance against electrolyte, so that the leakage of the electrolyte is also prevented. Consequently, the decrease in battery capacity of the battery of this embodiment becomes very small so that the long-term reliability is improved.

As described above, in the battery of this embodiment, the penetration of moisture is prevented by the outside sealing material 48 and the leakage of electrolyte is prevented by the inside sealing material 47. Therefore, the deterioration due to the ingress of atmosphere such as moisture and the leakage of electrolyte can be prevented.

The component material of the inside sealing material 47 is not limited to the silicone-group adhesive agent so far as it has a large resistance against the electrolyte. Further, the component material of the outside sealing material 48 is not limited to the denatured polypropylene resin so far as it has a small moisture permeability.

Moreover, the structure of the sealing material 4 is not limited to the double-layer structure. However, it may be a structure including three or more layers, so far as a layer composed of a material having a small moisture permeability is installed at an outside and a layer composed of a material having a large resistance against the electrolyte is installed at an inside.

Embodiment 4

Figure 9:
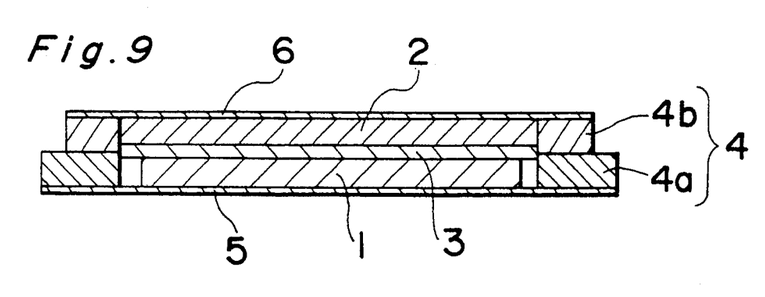
FIG. 9 is a vertical sectional view showing a film type battery of an embodiment 4.

FIG. 9 is a vertical sectional view showing a film type battery of this embodiment. In the figure, components same with or similar to those of FIG. 1 are attached with same symbols. This film type battery has a thickness of 0.1 mm. The sealing material 4 made of denatured polypropylene resin has a double-layer structure comprising a negative-side sealing material 4a and a positive-side sealing material 4b. Outside dimensions of the negative-side sealing material 4a are different from those of the positive-side sealing material 4b, and the negative-side sealing material 4a is made larger than the sealing material 4b by a width X. The negative terminal plate 5 has same outside dimensions as those of the negative-side sealing material 4a, and the positive terminal plate 6 also has same outside dimensions as those of the positive-side sealing material 4b. The sealing materials 4a and 4b are melt bonded to the terminal plates 5 and 6, respectively. The sealing material 4a is bonded to the sealing material 4b by means of thermal bonding or through adhesive agent.

Figure 10:
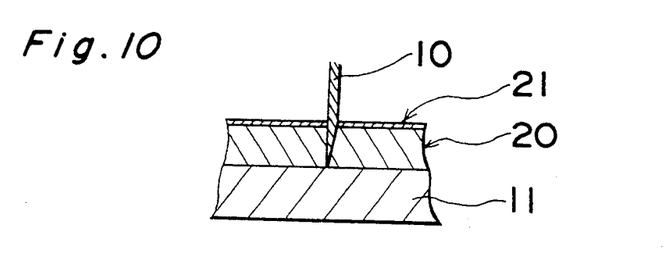
FIG. 10 through FIG. 12 are vertical sectional views showing a part of manufacturing process, in order, of the film type battery of embodiment 4.
Figure 11:
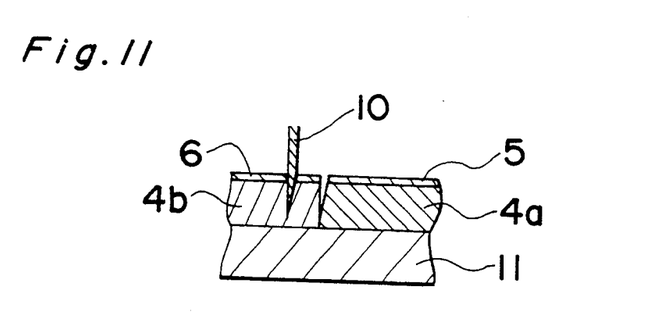
Figure 12:
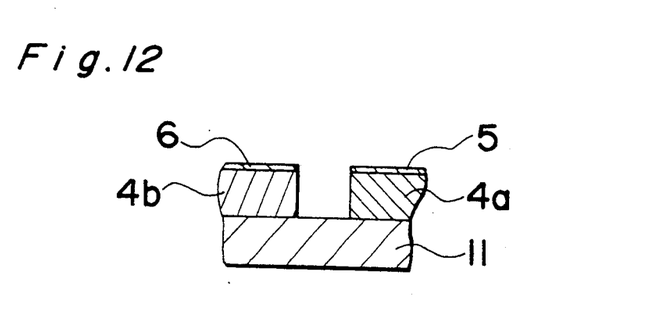

In a manufacturing process of the film type battery having the above structure, a junction of the sealing material 4a with the terminal plate 5 and a junction of the sealing material 4b with the terminal plate 6 are manufactured simultaneously and consecutively through the following processes. Namely, in the first place, a grid 20 as illustrated in FIG. 16 is prepared, and the grid 20 is melt bonded to a stainless plate 21 becoming the terminal plate. Incidentally, the grid 20 is made of the same material as that of the sealing material 4, has the same thickness as those of the sealing materials 4a and 4b, and includes a structure integrating a large number of the sealing materials 4a and 4b. In the second place, the grid 20 is placed on the hard ground film 11 and a cut is made into the grid 20 by the half cutter 10 as shown by FIG. 10, so as to separate it as shown by FIG. 11. In FIG. 11, for example, a right side is assumed as the junction of the sealing material 4a with the terminal plate 5, and a left side is assumed as the junction of the sealing material 4b with the terminal plate 6. FIG. 10 through FIG. 12 correspond to sectional views taken on a line XVII—XVII of FIG. 16. Then, a cut is made only into the junction of the sealing material 4b with the terminal plate 6 by the half cutter 10 as shown by FIG. 11, so that the junction of the sealing material 4b with the terminal plate 6 is removed from the cut portion as shown in FIG. 12. The junction of the sealing material 4a with the terminal plate 5 and the junction of the sealing material 4b with the terminal plate 6, which have been prepared as described above, are put together and adhered so as to sandwich the generating element comprising the negative active material layer 1, the positive active material layer 2 and the electrolyte layer 3.

Numbers of battery producing the external short-circuiting were examined when the battery of this embodiment and conventional battery as illustrated in FIG. 15 were manufactured 100 specimens for each. Results were zero piece for the battery of this embodiment and three pieces for the conventional battery. Namely, the external short-circuiting due to the contact of peripheral edges of the terminal plates 5 and 6 is positively prevented in the battery of this embodiment. Further, since it becomes unnecessary to remove only peripheral edges of the terminal plates 5 and 6 from the junction of the sealing material 4a with the terminal plate 5 and the junction of the sealing material 4b with the terminal plate 6 respectively, the work using the half cutter 10 is simple so that the productivity is improved.

As described above, in the battery of this embodiment, the outside dimensions of the junction of the sealing material 4a with the terminal plate 5 are different from those of the junction of the sealing material 4b with the terminal plate 6, so that the external short-circuiting due to the contact of the terminal plates 5 and 6 at their peripheral edges can be prevented securely. Further, the manufacturing work using the half cutter 10 can be simplified, so that the productivity can be improved.

Industrial Applicability

The film type battery of this invention is excellent in a long-term reliability as compared with a conventional battery, so that it has a high value in use for a power supply for portable electric equipments and battery-powered equipments.

What is claimed is:

1. A film battery comprising a generating element which is formed by laminating a negative active material layer, an electrolyte layer and a positive active material layer, terminal plates which are installed on and under the generating element and serve also as a current collector and a container, and a frame-shaped sealing material which is installed on peripheral edges of the terminal plates, seals the generating element in between the both terminal plates and insulates one terminal plate from the other; wherein the sealing material is formed into a vertical multi-layer structure in which at least one layer is made of metal and the others are made of an electrical insulator material, and wherein the electric insulator layer of the sealing material consists essentially of a single synthetic resin composition.

2. A film battery as set forth in claim 1, in which the metallic layer of the sealing material is composed of aluminium, cobar, Fe—Ni alloy, stainless steel, copper or nickel.

3. A film battery as set forth in claim 1, in which the synthetic resin is sulfide-group adhesive agent.

4. A film battery comprising a generating element which is formed by laminating a negative active material layer, an electrolyte layer and a positive active material layer, terminal plates which are installed on and under the generating element and serve also as a current collector and a container, and a frame-shaped sealing material which is installed on peripheral edges of the terminal plates, seals the generating element in between the both terminal plates and insulates one terminal plate from the other; wherein the sealing material is formed into an outside/inside multi-layer structure in which a material having a moisture permeability is used for an outside layer and a material having a resistance against an electrolyte is used for an inside layer.

5. A film battery as set forth in claim 4, in which denatured polyolefin-group resin is used for the outside layer.

6. A film battery as set forth in claim 4, in which silicone rubber-group adhesive agent is used for the inside layer.

7. A film battery as set forth in claim 4, in which the multi-layer is double-layer.

* * * * *